United States Patent
McLeod et al.

(10) Patent No.: US 10,445,121 B2
(45) Date of Patent: Oct. 15, 2019

(54) BUILDING VIRTUAL MACHINE DISK IMAGES FOR DIFFERENT CLOUD CONFIGURATIONS FROM A SINGLE GENERIC VIRTUAL MACHINE DISK IMAGE

(75) Inventors: Ian Scott McLeod, Chicago, IL (US); Steven M. Loranz, Oak Park, IL (US); Christopher Lalancette, Somerville, MA (US); John Dunning, Stow, MA (US); Carl C. Trieloff, Littleton, MA (US)

(73) Assignee: Red Hat Inc., Raleigh, NC (US)

(*) Notice: Subject to any disclaimer, the term of this patent is extended or adjusted under 35 U.S.C. 154(b) by 1160 days.

(21) Appl. No.: 13/403,824

(22) Filed: Feb. 23, 2012

(65) Prior Publication Data
US 2013/0227089 A1  Aug. 29, 2013

(51) Int. Cl.
*G06F 9/455* (2018.01)

(52) U.S. Cl.
CPC .. *G06F 9/45558* (2013.01); *G06F 2009/4557* (2013.01); *G06F 2009/45562* (2013.01)

(58) Field of Classification Search
CPC ......... G06F 2009/4557; G06F 9/45558; G06F 2009/45562
See application file for complete search history.

(56) References Cited

U.S. PATENT DOCUMENTS

| | | | |
|---|---|---|---|
| 2006/0085785 A1* | 4/2006 | Garrett | G06F 9/45558 718/1 |
| 2008/0082976 A1 | 4/2008 | Steinwagner et al. | |
| 2009/0007105 A1 | 1/2009 | Fries et al. | |
| 2009/0077551 A1* | 3/2009 | Whiteley | 718/1 |
| 2009/0222474 A1* | 9/2009 | Alpern | G06F 9/45558 |
| 2009/0300076 A1 | 12/2009 | Friedman | |
| 2010/0306759 A1 | 12/2010 | Kohler et al. | |
| 2011/0078681 A1* | 3/2011 | Li et al. | 718/1 |
| 2011/0126207 A1 | 5/2011 | Wipfel et al. | |
| 2011/0153697 A1 | 6/2011 | Nickolov | |

(Continued)

OTHER PUBLICATIONS

U.S. Appl. No. 13/303,651, Automation of Virtual Machine Installation by Splitting an Installation Into a Minimal Installation and Customization, filed Nov. 23, 2011.

(Continued)

*Primary Examiner* — Nam T Tran
(74) *Attorney, Agent, or Firm* — Lowenstein Sandler LLP (57) ABSTRACT

A computer system receives a request to instantiate a virtual machine (VM) in a first target cloud and a second target cloud. The target clouds operate with different configuration parameters. The system modifies a generic VM disk image that is not formatted for the first or second target cloud to create a cloud-formatted VM disk image for the first target cloud and a cloud-formatted VM disk image for the second target cloud. The first target cloud cloud-formatted VM disk image is based on the first target cloud configuration parameters, and the second target cloud cloud-formatted VM disk image is based on the second target cloud configuration parameters. The system instantiates a VM in the first target cloud using the first target cloud cloud-formatted VM disk image and a VM in the second target cloud using the second target cloud cloud-formatted VM disk image.

20 Claims, 5 Drawing Sheets

(56) References Cited

U.S. PATENT DOCUMENTS

| | | | |
|---|---|---|---|
| 2011/0214124 A1* | 9/2011 | Ferris | G06F 8/63 709/223 |
| 2011/0264776 A1* | 10/2011 | Clerc | G06F 9/4416 709/222 |
| 2011/0302580 A1* | 12/2011 | Iikura et al. | 718/1 |
| 2012/0084769 A1 | 4/2012 | Adi et al. | |
| 2012/0260228 A1 | 10/2012 | Mallick et al. | |
| 2013/0132950 A1 | 5/2013 | McLeod et al. | |
| 2013/0276068 A1 | 10/2013 | Alwar | |

OTHER PUBLICATIONS

DMTF, Open Virtualization Format Specification; Feb. 22, 2009; Version 1.0.0.
http://web.archive.org/web/20100513082445/http://en.wikipedia.org/wiki/Open_Virutaulization_Format; May 13, 2010.
Susestudio,com, "A Revolutionary New Way to Create Technology," as downloaded on Nov. 23, 2011 from http://susestudio.com, 2 pages.
USPTO, Office Action for U.S. Appl. No. 13/303,651, dated Sep. 27, 2013.
USPTO, Office Action for U.S. Appl. No. 13/303,651, dated Feb. 25, 2014.
USPTO, Office Action for U.S. Appl. No. 13/303,651, dated Mar. 2, 2015.
USPTO, Office Action for U.S. Appl. No. 13/303,651, dated Jul. 6, 2015.
USPTO, Office Action for U.S. Appl. No. 13/303,651, dated Nov. 27, 2015.
USPTO, Advisory Action for U.S. Appl. No. 13/303,651, dated May 6, 2014.
USPTO, Advisory Action for U.S. Appl. No. 13/303,651, dated Sep. 2, 2015.
USPTO, Notice of Allowance for U.S. Appl. No. 13/303,651, dated Feb. 26, 2016.

* cited by examiner

BUILDING VIRTUAL MACHINE DISK IMAGES FOR DIFFERENT CLOUD CONFIGURATIONS FROM A SINGLE GENERIC VIRTUAL MACHINE DISK IMAGE

TECHNICAL FIELD

Embodiments of the present invention relate to virtual machines and, more particularly, to building virtual machine disk images for different cloud configurations from a single generic virtual machine disk image.

BACKGROUND

Cloud computing is generally becoming the platform of choice for businesses that want to reduce operating expenses and be able to scale resources rapidly. Eased automation, flexibility, mobility, resiliency, and redundancy are several other advantages of moving resources to the cloud. Many organizations are being introduced to cloud computing by building an on-premise Infrastructure-as-a-Service (IaaS) cloud, which delivers computing, storage, and networking resources to users. Clouds may be provided by different cloud providers and may have different cloud configuration parameters. The differences can relate to, for example, and not limited to, kernel configuration, network configuration, partitioning, service configuration, and authentication configuration. Enterprise system administrators typically need to manually define and configure virtual machines (VMs) according to the particular cloud configuration parameters. An enterprise may typically limit its use to one cloud provider because it may be difficult to manage the manual configuration for the various clouds. Conventional efforts are typically inefficient because an extensive amount of time and work is dedicated to defining and configuring VMs for different cloud environments.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Embodiments of the invention are directed to a method and system for building virtual machine (VM) disk images for different cloud configurations using a single generic VM disk image. A server computer system receives a request to instantiate a virtual machine in a first target cloud and a second target cloud. The request can be for any number of target clouds. For brevity and simplicity, a first target cloud and a second target cloud are used as an example throughout this document. The first target cloud and a second target cloud operate with different configuration parameters. For example, the first target cloud configures its network using DHCP (Dynamic Host Configuration Protocol) and the second target cloud configures its network using static IP (Internet Protocol) addresses.

The server computer system modifies a generic VM disk image that is not formatted for the first target cloud or the second target cloud to create a cloud-formatted VM disk image for the first target cloud and a cloud-formatted VM disk image for the second target cloud. The cloud-formatted VM disk image for the first target cloud is based on the configuration parameters of the first target cloud, and the cloud-formatted VM disk image for the second target cloud is based on the configuration parameters of the second target cloud. The server computer system instantiates a VM in the first target cloud using the cloud-formatted VM disk image for the first target cloud and instantiates a VM in the second target cloud using the cloud-formatted VM disk image for the second target cloud.

There is little to no benefit in running the operating system installer multiple times, as the end result with the same inputs will be exactly the same bits on disk. Embodiments save the initial installation time with the use of a single generic VM disk image to build VM disk images that can be uploaded to clouds having different configuration parameters without having to repeatedly run the operating system installer.

Figure 1:
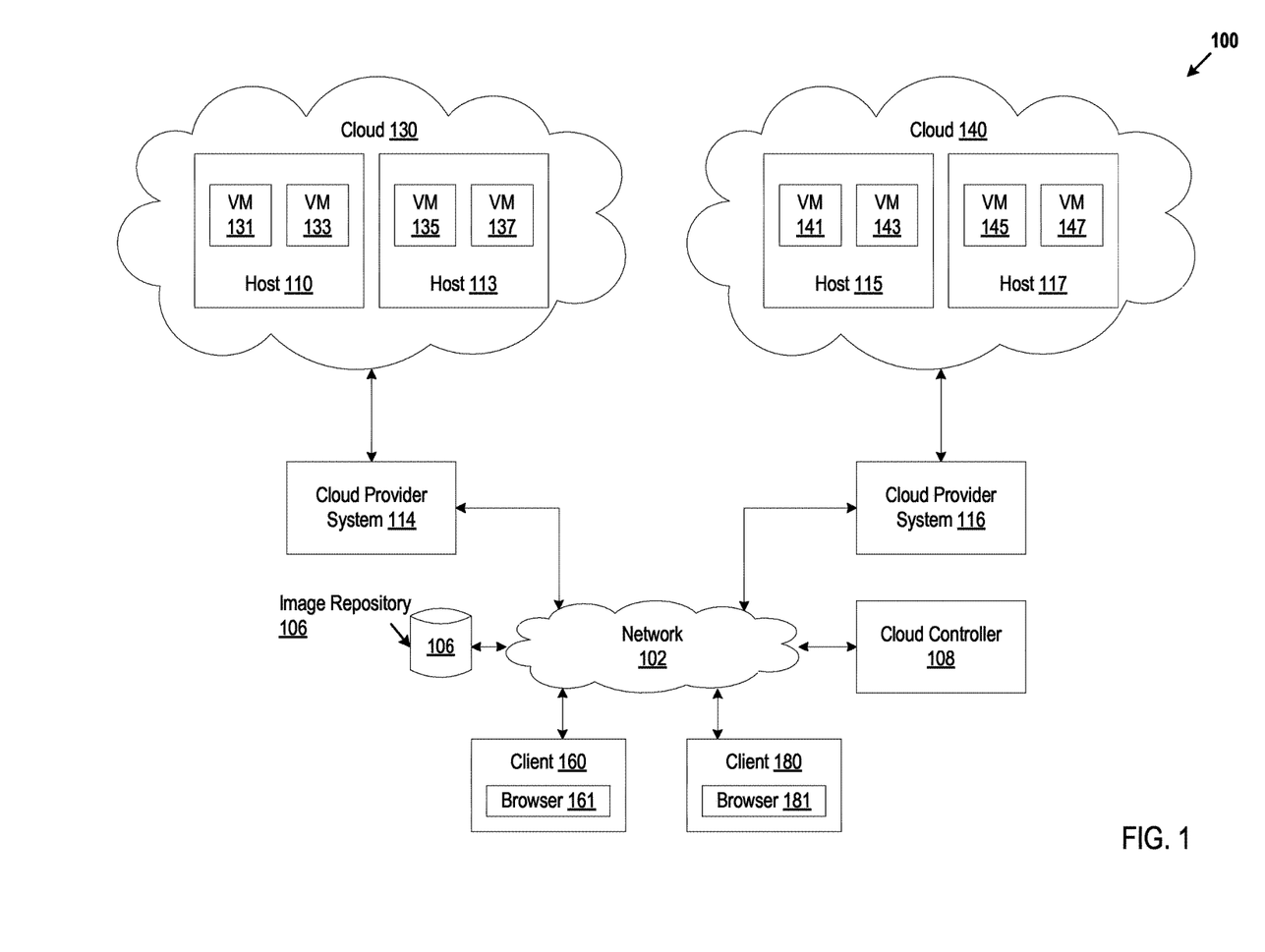
FIG. 1 illustrates exemplary system architecture, in accordance with various embodiments of the present invention.

FIG. 1 is a block diagram of a network architecture 100 for a distributed computing system, in which embodiments of the invention may operate. The network architecture 100 can include multiple clouds 130,140 managed by various cloud provider systems 114,116. There can be any number of clouds 130,140 and cloud provider systems 114,116. For brevity and simplicity, two clouds 130,140 are used as an example throughout this document. The clouds 130,140 provide virtual machines. There can be any number of virtual machines in a cloud 130,140. For brevity and simplicity, four virtual machines in each cloud 130,140 are used as an example in architecture 100. For example, cloud 130 provides virtual machines 131,133,135,137, and cloud 140 provides virtual machines 141,143,145,147. Each virtual machine is hosted on a physical machine configured as part of the cloud 130,140, such as hosts 110,113,115,117. Physical machines (e.g., hosts 110,113,115,117) can be located in a data center. The cloud provider systems 114,116 and clouds 130,140 may be provided as an infrastructure as a service (IaaS) layer. The cloud provider systems 114,116 and clouds 130,140 may be provided by, for example, by the same or different third party cloud providers. For example, cloud provider system 114 and cloud 130 may be provided by Cloud-Provider-1, and cloud provider system 116 and cloud 140 may be provided by Cloud-Provider-2. A cloud provider can provide more than one type of cloud provider system 114,116 and more than one type of cloud 130,140. Users can interact with applications executing on cloud-based virtual machines using client computer systems, such as clients 160,180, via corresponding web browser programs 161,181. There can be any number of clients. For brevity and simplicity, two clients 160,180 are used as an example in architecture 100. Users may have one or more accounts associated with cloud provider systems 114,116.

Clients 160,180 are connected to the one or more hosts 110,113,115,117 and the one or more cloud provider systems 114,116 via a network 102, which may be a private network (e.g., a local area network (LAN), a wide area network (WAN), intranet, or other similar private networks) or a public network (e.g., the Internet). Each client 160,180 may be a mobile device, a PDA, a laptop, a desktop computer, or any other computing device. Each host 110,113,115,117 may be a server computer system, a desktop computer or any other computing device. The cloud provider systems 114, 116 may include one or more machines such as server computers, desktop computers, etc.

In one embodiment, the cloud provider systems 114,116 are coupled to a cloud controller 108 via the network 102. The cloud controller 108 may reside on a machine (e.g., server computers, desktop computers, etc.). The cloud controller 108 may be maintained by a cloud consumer of the clouds 130,140, such as an enterprise (e.g., business, company). In another embodiment, the cloud controller 108 may be maintained by a third party cloud provider.

The cloud controller 108 can manage the deployment of virtual machines in the clouds 130,140. The cloud controller 108 can receive input, for example, from a system administrator via a client 160,180, requesting a VM 131,141 to be deployed in a first target cloud 130 and a second target cloud 140. The request can be for any number of target clouds. The first target cloud 130 and the second target cloud 140 may have different cloud configuration parameters. The differences can relate to, for example, and not limited to, kernel configuration, network configuration, partitioning, service configuration, and authentication configuration.

The request can indicate the operating system (OS) for the VM that is to be deployed in the target clouds 130,140. The cloud controller 108 can build a cloud-formatted VM disk image for different cloud configurations, from a single generic VM disk image. A VM disk image may include an operating system (a guest operating system) and applications running on the guest operating system, as well as libraries and data used by the guest operating system and the applications. A generic VM disk image is not formatted for any cloud and is not capable to be uploaded to any cloud provider system 114,116. A cloud-formatted VM disk image is configured for a certain cloud provider system 114,116 and can be uploaded to the particular cloud provider system 114,116. For example, the cloud controller 108 can build a cloud-formatted VM disk image that can be pushed to the first target cloud 130.

In one embodiment, the cloud controller 108 creates a generic VM disk image based on a particular OS (e.g., as specified in the request of a system administrator) and stores the generic VM disk image in an image repository 106 that is coupled to the cloud controller 108. In one embodiment, the cloud controller 108 searches the image repository to determine whether a generic VM disk image that corresponds to the requested OS is already stored in the image repository 106. The repository 106 may reside locally or remotely and may represent a single data structure or multiple data structures (databases, repositories, files, etc.) residing on one or more mass storage devices, such as magnetic or optical storage based disks, solid-state drives (SSDs) or hard drives.

The cloud controller 108 can modify the generic VM disk image to create a cloud-formatted VM disk image that is compatible with the particular target clouds 130,140. The cloud controller 108 can modify the generic VM disk image based on the cloud configuration parameters for the particular target clouds. One embodiment of modifying a generic VM disk image for the particular target clouds is described in greater detail below in conjunction with FIG. 2. For example, target cloud 130 configures its network using DHCP (Dynamic Host Configuration Protocol) and target cloud 140 configures its network using static IP (Internet Protocol) addresses. The cloud controller 108 can modify a generic VM disk image to create a cloud-formatted VM disk image that uses DHCP for target cloud 130 and to create another cloud-formatted VM disk image that uses static IP addresses for target cloud 140. In one embodiment, the cloud controller 108 creates a cloud-formatted VM disk image for each target cloud in the request. In another embodiment, the cloud controller 10 creates one cloud-formatted VM disk image that can be used for the target clouds in the request.

The cloud controller 108 can store the cloud-formatted VM disk images in the image repository 106. The cloud-formatted VM disk images can be pushed to the corresponding target clouds 130,140 to create corresponding cloud-specific image identifiers (IDs). The cloud-specific image IDs can be used to instantiate the requested virtual machine 131,141 in the corresponding target cloud 130,140. For example, the cloud-formatted VM disk image for the first target cloud 130 may be pushed to the first target cloud 130 to create Image-ID-1. The cloud controller 108 may use Image-ID-1 to instantiate VM 131 in the first target cloud 130. The cloud controller 108 may push the cloud-formatted VM disk image for the second target cloud 140 to the second target cloud 140 to create Image-ID-2 and may use Image-ID-2 to instantiate VM 141 in the second target cloud 140.

Figure 2:
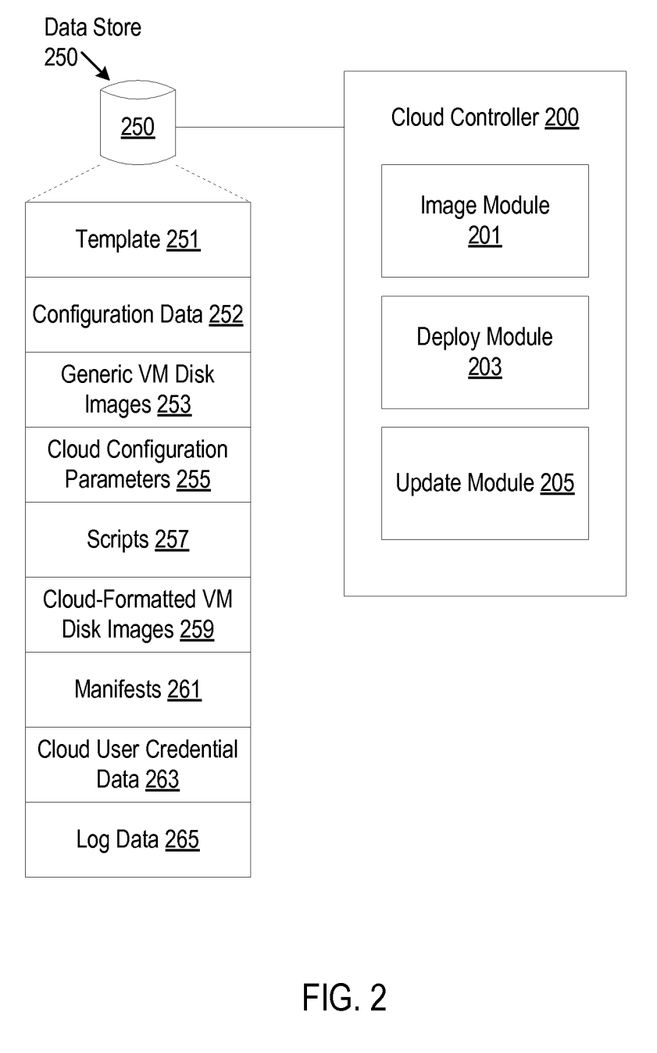
FIG. 2 is a block diagram of a cloud controller, in accordance with an embodiment.

FIG. 2 illustrates a block diagram of a cloud controller 200, according to one embodiment. Cloud controller 200 may correspond to a cloud controller 108 of FIG. 1. In one embodiment, cloud controller 200 includes an image module 201, a deploy module 203, and an update module 205. Note that in alternative embodiments, one or more of the image module 201, the deploy module 203, and the update module 205 may be combined into a single module and additionally, the functionality of any of modules may be divided between multiple modules.

The image module 201 can receive a request to create a build of a virtual machine in a number of target clouds that have different cloud configuration parameters. The image module 201 can receive the request as user input via a user interface, such as a command line interface or a graphical user interface (GUI). The request can reference data (e.g., an XML template) that describes the operating system and/or software packages to be installed on the virtual machine. The template 251 can be stored in a data store 250 that is coupled to the image module 201. The data store 250 may reside locally or remotely and may represent a single data structure or multiple data structures (databases, repositories, files, etc.) residing on one or more mass storage devices, such as magnetic or optical storage based disks, solid-state drives (SSDs) or hard drives.

The image module 201 can identify a generic VM disk image 253 that corresponds to the operating system that is specified by the request. A generic VM disk image contains an operating system for the requested VM. In some embodiments, the generic VM disk image contains a minimally functional operating system. A minimally functional operating system is a version of the requested operating system that includes the minimum number of components of the operating system, such as a kernel, virtual drives, minimum maintenance tool, minimum user space tool, packages repository, etc. In some embodiments, the generic VM disk image contains a full general purpose operating system.

In one embodiment, the image module 201 creates a generic VM disk image based on the operating system in the request and stores the generic VM disk image 253 in the data store 250. In one embodiment, the data store 250 already stores generic VM disk images 253 for various operating systems that were previously created, for example, by the image module 201, and the image module 201 searches the data store 250 to determine whether there is a generic VM disk image 253 that corresponds to the requested operating system. The image module 201 can use configuration data 252 that is stored in the data store 250 to identify a location (e.g., path) of the generic VM disk images 253. The configuration data 255 can define the one or more paths (e.g., /var/lib/libvirt/images) that store the generic VM disk images 253.

The image module 201 can modify the generic VM disk image to create a cloud-formatted VM disk image 257 for each target cloud in the request and store the cloud-formatted VM disk images 257 in the data store 250. The cloud controller 108 can modify the generic VM disk image 253 based on the cloud configuration parameters 255 for a particular target cloud. The cloud configuration parameters 255 can be predefined data and/or user-defined data. The cloud configuration parameters 255 can describe the change(s) to make to the generic VM disk image 253, such as changing kernel configuration, network configuration, partitioning, services, and authentication configuration.

The image module 201 can automatically modify the generic VM disk image 253 by using an emulator (e.g., QEMU) to run the generic VM disk image 253 as a guest operating system in a guest environment in a virtualization infrastructure (e.g., a Kernel-based Virtual Machine (KVM) infrastructure). The image module 201 can use a daemon and management tool, such as libvirt, to manage the virtualization infrastructure (e.g., KVM). The image module 201 can use a library of tools to instruct the emulator to modify the guest environment. For example, the image module 201 can send instructions to edit a file, run a program, install a driver, etc. in the guest environment to make the changes described in the cloud configuration parameters 255. For example, the image module 201 can set up hard drives for a particular target cloud by editing a configuration file (e.g., fstab) in the guest environment. In one embodiment, image module 201 changes the guest environment by executing predefined scripts 259 that are stored in the data store 250 to use the library of tools. One embodiment of modifying the generic VM disk image is described in greater detail below in conjunction with FIG. 3. The image module 201 can capture the image of the guest environment to create a cloud-formatted VM disk image for the particular target cloud and store the cloud-formatted VM disk image 257 in the data store 250.

The image module 201 can create a manifest 261 for the cloud-formatted VM disk images 257 and store the manifest 261 in the data store 250. The manifest 261 can be an ICICLE (image content and intended configuration language) that provides a detailed description of the software installed and software revisions in the cloud-formatted VM disk image 257.

The deploy module 203 can prepare the cloud-formatted VM disk image 257 for deployment on the corresponding target clouds. The deploy module 203 can prepare the cloud-formatted VM disk image 257 based on the cloud configuration parameters 255. Examples of preparation can include, and are not limited to, migrating a cloud-formatted VM disk image 257 in an import domain for a particular cloud provider, bundling a cloud-formatted VM disk image 257 for a particular cloud provider, registering a cloud-formatted VM disk image 257 in a region for a particular cloud provider. The deploy module 203 can use cloud user credential data 263 that is stored in the data store 250 to prepare a cloud-formatted VM disk image 257. Cloud users may have one or more user accounts with one or more cloud providers. The cloud user credential data 263 can include, for example, user identifiers, passwords, certificates, etc., for the user accounts. One embodiment of preparing a cloud-formatted VM disk image for deployment is described in greater detail below in conjunction with FIG. 3. The deploy module 203 can push the cloud-formatted VM disk image 257 to a particular target cloud to create a cloud-specific image ID. The deploy module 203 can use the cloud-specific image ID (e.g., Image-ID-1, Image-ID-2) to instantiate the requested VM in the particular target cloud.

An instantiated virtual machine in a target cloud may be changed and may no longer reflect the corresponding cloud-formatted VM disk image 257 that is stored in the data store 250. For example, software updates may be installed on the virtual machine. The update module 205 can create an updated cloud-formatted VM disk image and an updated manifest to reflect the updated VM in the target cloud. The update module 205 can receive change data, for example, from a cloud provider or from an agent executing in the virtual machine, and create an updated cloud-formatted VM disk image based on the change data. The change data can indicate the change(s) that were made to the instantiated cloud-formatted VM disk image, such as software changes, configuration changes, etc. Embodiments of created an updated cloud-formatted VM disk image to reflect the change data is described in greater detail below in conjunction with FIG. 4. The updated cloud-formatted VM disk image can be stored with the cloud-formatted VM disk images 257 in the data store 250. The updated manifest can be stored with the manifests 261 in the data store 250. The deploy module 203 can prepare the updated cloud-formatted VM disk image for deployment in the appropriate cloud provider(s).

The image module 201, deploy module 203, and update module 205 can log progress data to one or more logs 265 in the data store 250 to reflect the status of the build process, the preparation process, and/or the update process. The one or more logs 265 can be provided to one or more users (e.g., system administrators).

Figure 3:
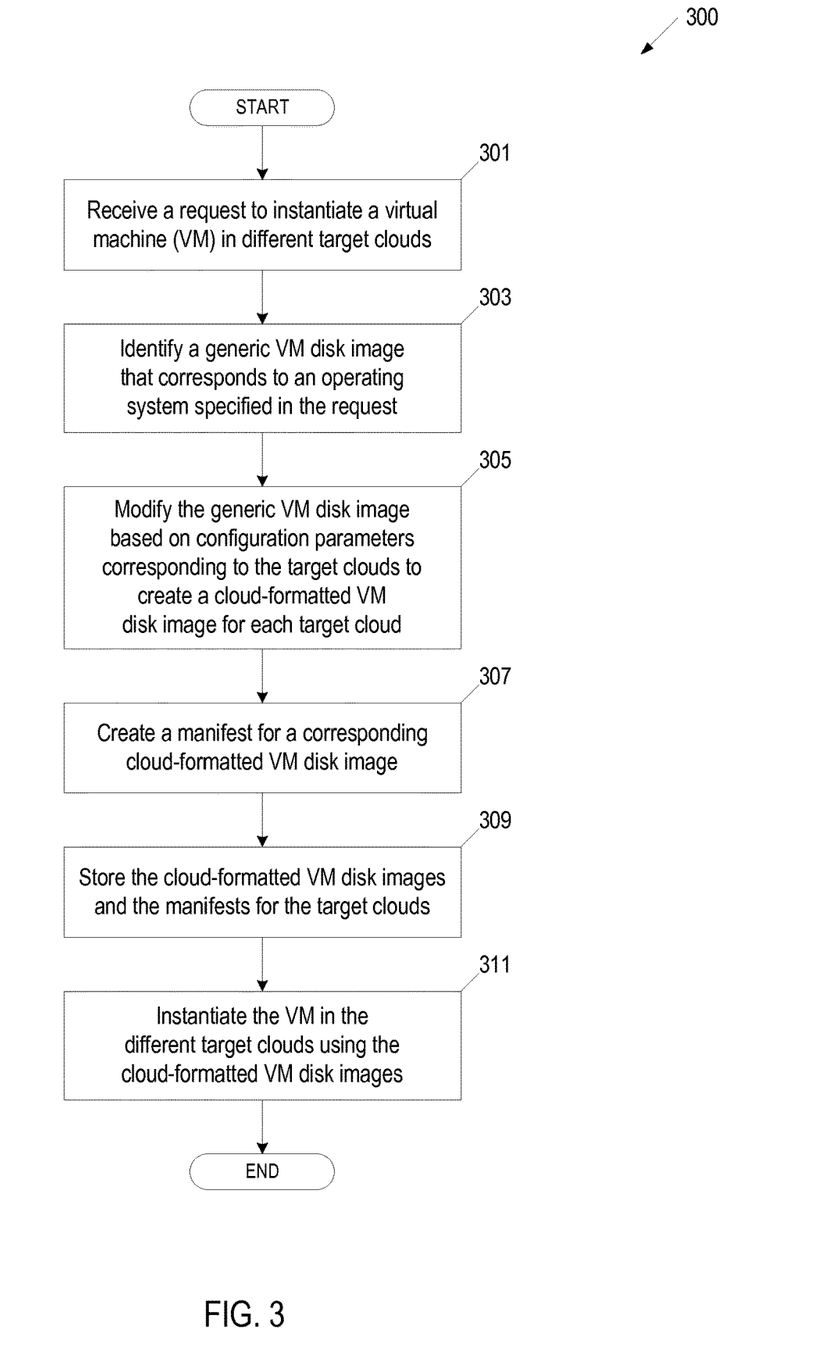
FIG. 3 is a flow diagram illustrating an embodiment for a method of building a cloud-formatted virtual machine (VM) disk image for different cloud configurations from a single generic virtual machine disk image.

FIG. 3 is a flow diagram of an embodiment of a method 300 for building a cloud-formatted virtual machine (VM) disk image for different cloud configuration parameters from a single generic virtual machine disk image. The method 300 is performed by processing logic that may comprise hardware (circuitry, dedicated logic, etc.), software (such as is run on a general purpose computer system or a dedicated machine), or a combination of both. In one embodiment, the method 300 is performed by the cloud controller 108 of FIG. 1.

At block 301, processing logic receives a request to instantiate a virtual machine (VM) in target clouds that have different cloud configuration parameters. The different cloud configuration parameters can relate to, for example and not limited to, kernel configuration, network configuration, partitioning, service configuration, and authentication configuration. The request may be for any number of target clouds. The target clouds may correspond to different cloud providers or the target clouds may correspond to the same cloud provider, but have different cloud configuration parameters. For example, Cloud-1 and Cloud-2 are provided by Cloud-Provider-1, but each cloud has different cloud configuration parameters. In one embodiment, the request is a single command (e.g., a single command line interface command) to build a cloud-formatted VM disk image for the first target cloud and the second target cloud.

At block 303, processing logic identifies a generic VM disk image that corresponds to an operating system specified in the request. For example, the request is to build a VM having a Linux OS on Cloud-1 and a VM having a Linux operating system on Cloud-2. In one embodiment, processing logic creates the generic VM disk image. In another embodiment, processing logic locates the generic VM disk image in a predefined file location (e.g., /var/lib/libvirt/images) in a data store (e.g., image repository) based on configuration data. The generic VM disk image is not formatted for any cloud. For example, the generic VM disk image is of an operating system (e.g., minimal installation of an OS or full general purpose OS), but is not configured to run on a cloud. In another example, the generic VM disk image is of an operating system and one or more software packages, such as an application server package, a web server package, a database management system package, etc., but is not configured to run in a cloud. In one embodiment, the generic VM disk image is in a .dsk file format.

At block 305, processing logic modifies the generic VM disk image based on configuration data for the target clouds in the request to create a cloud-formatted VM disk image for each target cloud in the request. The cloud-formatted VM disk images can be uploaded to the cloud providers corresponding to the target clouds. Processing logic can identify the cloud configuration parameters for the particular target clouds in a data store that is coupled to the cloud controller. In one embodiment the cloud configuration parameters are stored in one or more files (e.g., configuration files, text files).

For each target cloud, processing logic can use an emulator (e.g., QEMU) to run the generic VM disk image in a guest environment in a virtualization infrastructure (e.g., KVM). Processing logic can use a library of tools to instruct the emulator to modify (e.g., edit a file, run a program, install a driver, etc.) the guest environment to make the changes described in the cloud configuration parameters. For example, processing logic can configure network interface for the particular target clouds by editing or creating a file in the guest environment. Other examples can include, and are not limited to, processing logic associating a Dynamic Host Configuration Protocol client with the generic VM disk image, associating a static Internet Protocol address with the generic VM disk image, associating cloud management files with the generic VM disk image, and/or associating a hypervisor kernel with the generic VM disk image. For each target cloud, processing logic can capture the image of the guest environment to create a cloud-formatted VM disk image for the particular target cloud and store the cloud-formatted VM disk image in the data store. At block 307, processing logic creates a manifest for each cloud-formatted VM disk image and stores the cloud-formatted VM disk images for the target clouds and the corresponding manifests in the data store at block 309. Processing logic can execute a manifest tool to generate the manifest.

At block 311, processing logic instantiates a VM in the target clouds using the corresponding cloud-formatted VM disk image. For each target cloud, processing logic can prepare the cloud-formatted VM disk image for the target cloud to create a cloud-specific image ID. Processing logic can use the cloud-specific image ID (e.g., Image-ID-1) to instantiate the requested VM in the particular target cloud. Processing logic can prepare the cloud-formatted VM disk image based on cloud configuration parameters. Processing logic can use user credential data that is stored in the data store to push the cloud-formatted VM disk image to a target cloud. Other examples of preparation can include, and are not limited to, compressing the cloud-formatted VM disk image, encrypting a compressed or uncompressed cloud-formatted VM disk image, signing a cloud-formatted VM disk image, splitting a cloud-formatted VM disk image into manageable part for uploading to a target cloud, creating a manifest of the split cloud-formatted VM disk image, etc. For example, processing logic can prepare a cloud-formatted VM disk image for Cloud-1 by migrating the cloud-formatted into the import domain of cloud provider of Cloud-1. In another example, processing logic can bundle the cloud-formatted VM disk image for Cloud-2 and register the cloud-formatted VM disk image in an appropriate region for Cloud-2 to allow access for a specific Cloud-2 user. Processing logic may push the cloud-formatted VM disk image to Cloud-1 to create Image-ID-1 and processing logic may use Image-ID-1 to instantiate a VM in Cloud-1. Processing logic may push the cloud-formatted VM disk image for Cloud-2 to Cloud-2 to create Image-ID-2 and may use Image-ID-2 to instantiate a VM in Cloud-2.

Figure 4:
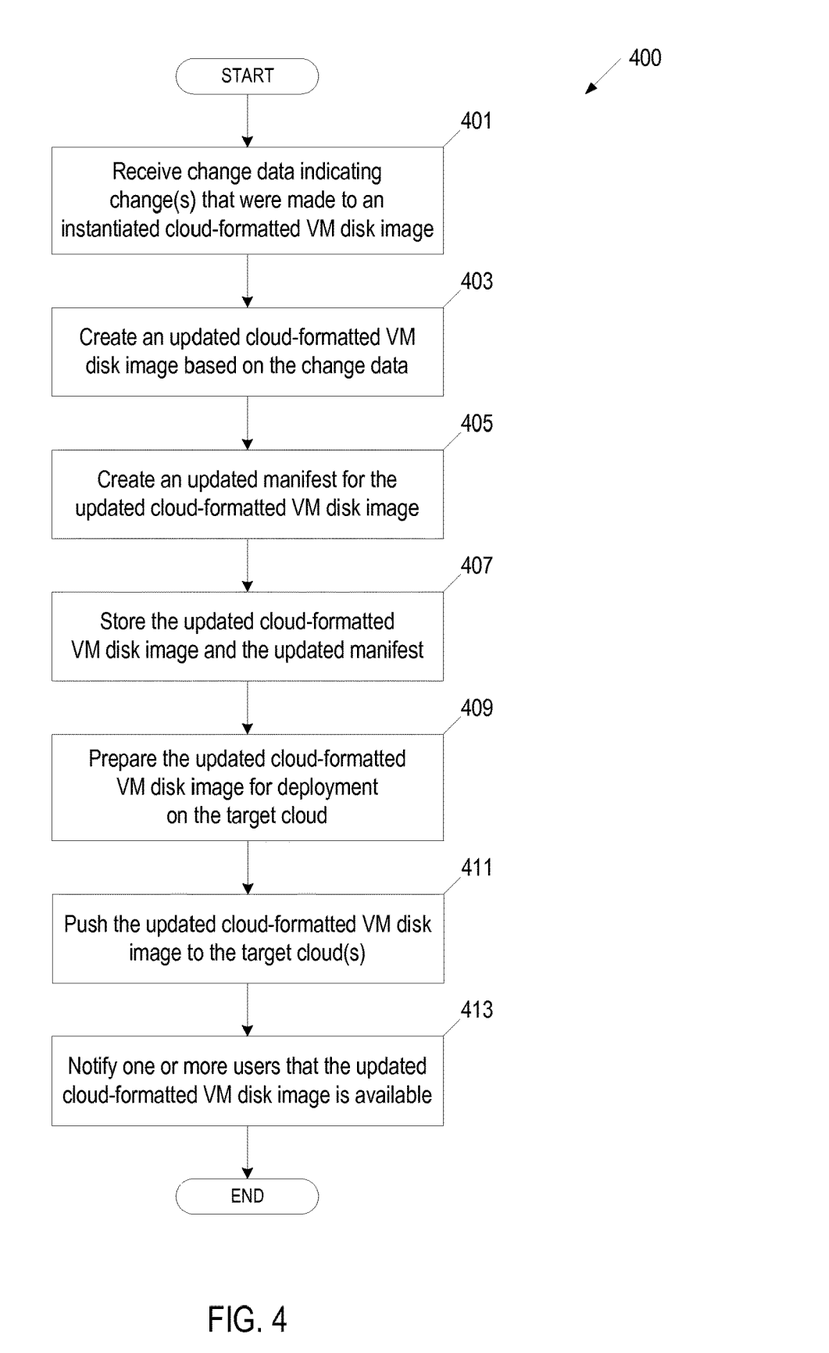
FIG. 4 is a flow diagram illustrating an embodiment for a method of updating a cloud-formatted virtual machine disk image.

FIG. 4 is a flow diagram of an embodiment of a method 400 for updating a cloud-formatted virtual machine disk image. The method 400 is performed by processing logic that may comprise hardware (circuitry, dedicated logic, etc.), software (such as is run on a general purpose computer system or a dedicated machine), or a combination of both. In one embodiment, the method 400 is performed by the cloud controller 108 of FIG. 1.

At block 401, processing logic receives change data indicating the change(s) that were made to an instantiated cloud-formatted VM disk image. At block 403, processing logic creates an updated cloud-formatted VM disk image for the target cloud. In one embodiment, processing logic identifies the original cloud-formatted VM disk image in a data store that corresponds to the changed data and updates the original cloud-formatted VM disk image in the data store to reflect the changes. In one embodiment, processing logic identifies the generic VM disk image used to create the original cloud-formatted VM disk image and uses the generic VM disk image to create a new cloud-formatted VM disk image to reflect the changes. The original cloud-formatted VM disk image can remain in the data store. At block 405, processing logic creates an updated manifest for the updated cloud-formatted VM disk image to reflect the changes. At block 407, processing logic stores the updated cloud-formatted VM disk image and the updated manifest.

At block 409, processing logic prepares the updated cloud-formatted VM disk image for deployment to the appropriate cloud provider(s). Processing logic can, for example, migrate the updated cloud-formatted VM disk image to an import domain for a particular cloud provider, bundle the updated cloud-formatted VM disk image for a particular cloud provider, register the updated cloud-formatted VM disk image in a region for a particular cloud provider, etc. At block 411, processing logic pushes the updated cloud-formatted VM disk image to the target cloud(s) and notifies one or more users (e.g., system administrators) that an updated cloud-formatted VM disk image is available. A user may restart the cloud instances using the updated cloud-formatted VM disk image.

Figure 5:
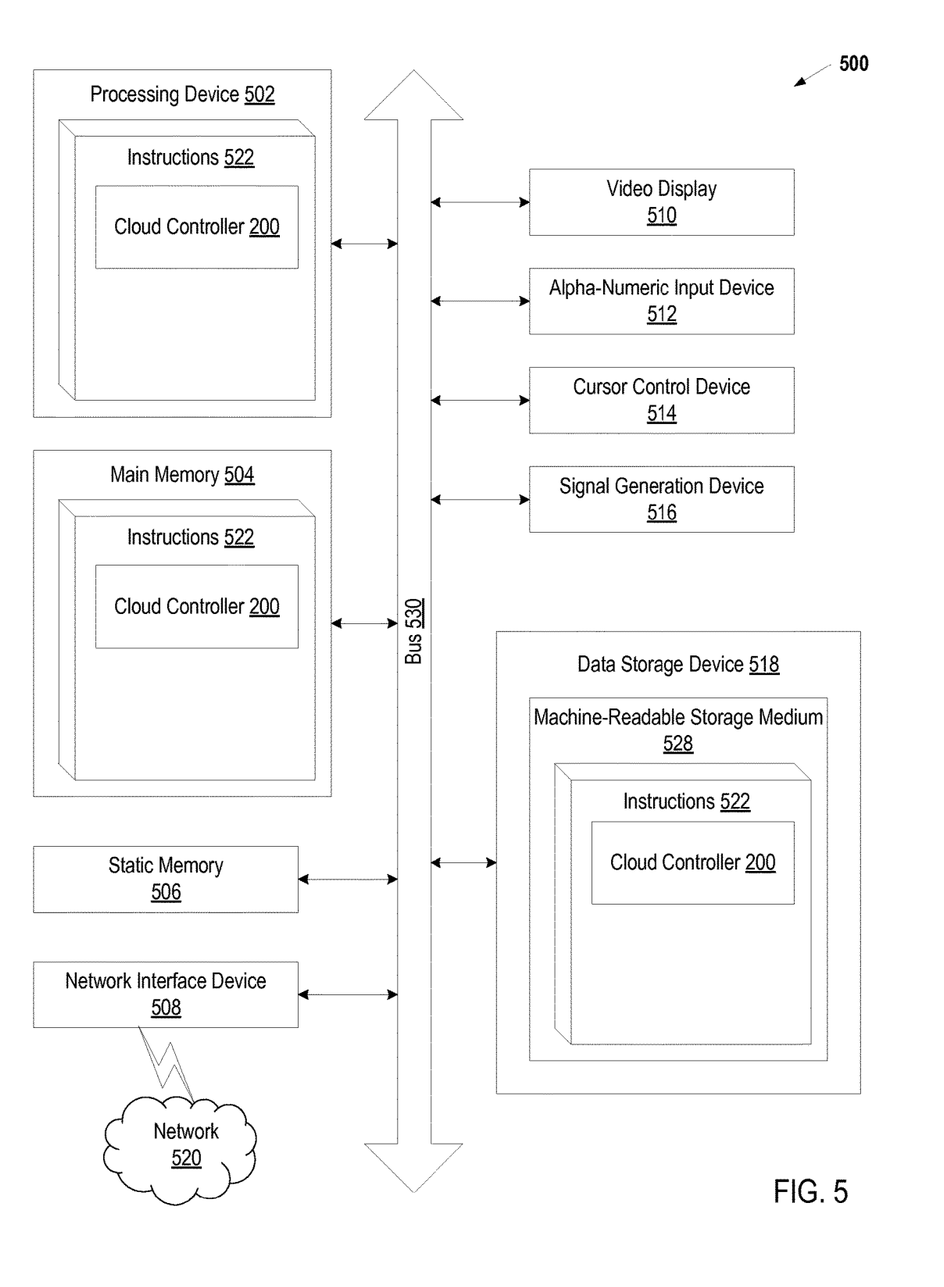
FIG. 5 is a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a cloud controller (e.g., cloud controller 200 of FIG. 2), and/or a software library containing methods that call a cloud controller. While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "modifying", "instantiating", "locating," "storing," "creating," "providing," "associating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relates to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a server, a request to instantiate a virtual machine (VM) in a first target cloud and a second target cloud, wherein the request indicates an operating system that is to be deployed in the first target cloud and the second target cloud, the first target cloud comprising a configuration parameter for the first target cloud that is different from configuration parameters of the second target cloud, the server managing deployment of virtual machines to the first target cloud being provided by a first cloud provider and the second target cloud being provided by a second cloud provider;
determining whether an image repository comprising a plurality of generic VM disk images, each corresponding to a different operating system, includes a generic VM disk image corresponding to the operating system indicated in the request, wherein the generic VM disk image is not formatted for the first target cloud or the second target cloud;
responsive to the image repository not including the generic VM disk image corresponding to the operating system indicated in the request, generating the generic VM disk image;
modifying, by a processing device executing the server, the generic VM disk image to create a cloud-formatted VM disk image for the first target cloud and a cloud-formatted VM disk image for the second target cloud, wherein modifying the generic VM disk image does not change the operating system of the generic VM disk image;
creating a manifest for the cloud-formatted VM disk image for the first target cloud, the manifest comprising a description of components in the cloud-formatted VM disk image, wherein the manifest is stored on the server;
receiving user credential data for a first user having a first user account with the first target cloud, and receiving user credential data for a second user having a second user account with the second target cloud;
instantiating, by the server, a VM in the first target cloud using the cloud-formatted VM disk image for the first target cloud and the user credential data for the first user having the first user account with the first target cloud;
receiving change data indicating a change made to the VM in the first target cloud, wherein the change is not reflected in the manifest stored on the server; and
instantiating, by the server, a VM in the second target cloud using the cloud-formatted VM disk image for the second target cloud and the user credential data for the second user having the second user account with the second target cloud.

2. The method of claim 1, wherein the first target cloud and the second target cloud correspond to different cloud providers.

3. The method of claim 1, wherein identifying the generic VM disk image comprises:
locating the generic VM disk image in a repository in view of the operating system specified in the request.

4. The method of claim 1, wherein the generic VM disk image comprises a minimal installation of an operating system that corresponds to the operating system specified in the request.

5. The method of claim 1, wherein the request is a single command to build a cloud-formatted VM disk image for the first target cloud and the second target cloud.

6. The method of claim 1, further comprising:
storing the cloud-formatted VM disk image for the first target cloud and the cloud-formatted for the second target cloud;
receiving change data indicating a change made to at least one of the VM in the first target cloud or the VM in the second target cloud;
creating at least one of an updated cloud-formatted VM disk image for the first target cloud or an updated cloud-formatted VM disk image for the second target cloud in view of the change data; and
providing at least one of the updated cloud-formatted VM disk image for the first target cloud to the cloud provider of the first target cloud and the updated cloud-formatted VM disk image for the second target cloud to the cloud provider of the second target cloud.

7. The method of claim 1, wherein modifying the generic VM disk image comprises at least one of:
associating a type of network protocol with the generic VM disk image, associating cloud specific management files with the generic VM disk image, defining a partitioning layout, enabling a service, disabling a service, associating an authentication certificate with the generic VM disk image, or associating a hypervisor kernel with the generic VM disk image.

8. A system comprising:
a memory; and
a processing device, operatively coupled to the memory, to:
receive, by a server hosted by the processing device, a request to instantiate a virtual machine (VM) in a first target cloud and a second target cloud, wherein the request indicates an operating system that is to be deployed in the first target cloud and the second target cloud, the first target cloud comprising a configuration parameter for the first target cloud that is different from configuration parameters of the second target cloud, wherein the first target cloud is provided by a first cloud provider and the second target cloud is provided by a second cloud provider, and the server is to manage deployment of virtual machines to the first target cloud and the second target cloud;
determine whether an image repository comprising a plurality of generic VM disk images, each corresponding to a different operating system, includes a generic VM disk image corresponding to the operating system indicated in the request, wherein the generic VM disk image is not formatted for the first target cloud or the second target cloud;
responsive to the image repository not including the generic VM disk image corresponding to the operating system indicated in the request, generate the generic VM disk image;
modify the generic VM disk image to create a cloud-formatted VM disk image for the first target cloud and a cloud-formatted VM disk image for the second target cloud, wherein modifying the generic VM disk image does not change the operating system of the generic VM disk image;
create a manifest for the cloud-formatted VM disk image for the first target cloud, the manifest comprising a description of components in the cloud-formatted VM disk image, wherein the manifest is stored on the server;
receive user credential data for a first user having a first user account with the first target cloud, and receive user credential data for a second user having a second user account with the second target cloud;

instantiate, by the server, a VM in the first target cloud using the cloud-formatted VM disk image for the first target cloud and the user credential data for the first user having the first user account with the first target cloud;

receive change data indicating a change made to the VM in the first target cloud, wherein the change is not reflected in the manifest stored on the server; and instantiate, by the server, a VM in the second target cloud using the cloud-formatted VM disk image for the second target cloud and the user credential data for the second user having the second user account with the second target cloud.

9. The system of claim 8, wherein the first target cloud and the second target cloud correspond to different cloud providers.

10. The system of claim 8, wherein to identify the generic VM disk image the processing device is to:

locate the generic VM disk image in a repository in view of an operating system specified in the request.

11. The system of claim 8, wherein the generic VM disk image comprises a minimal installation of an operating system that corresponds to the operating system specified in the request.

12. The system of claim 8, wherein the request is a single command to build a cloud-formatted VM disk image for the first target cloud and the second target cloud.

13. The system of claim 8, wherein the memory to store the cloud-formatted VM disk image for the first target cloud and the cloud-formatted for the second target cloud and the processing device is further to:

receive change data indicating a change made to at least one of the VM in the first target cloud or the VM in the second target cloud;

create at least one of an updated cloud-formatted VM disk image for the first target cloud or an updated cloud-formatted VM disk image for the second target cloud in view of the change data; and provide at least one of the updated cloud-formatted VM disk image for the first target cloud to the cloud provider of the first target cloud and the updated cloud-formatted VM disk image for the second target cloud to the cloud provider of the second target cloud.

14. The system of claim 8, wherein to modify the generic VM disk image the processing device is to at least one of:

associate a type of network protocol with the generic VM disk image, associate cloud specific management files with the generic VM disk image, define a partitioning layout, enable a service, disable a service, associate an authentication certificate with the generic VM disk image, or associate a hypervisor kernel with the generic VM disk image.

15. A non-transitory computer-readable storage medium comprising instructions that, when executed by a processing device, cause the processing device to:

receive, by a server hosted by the processing device, a request to instantiate a virtual machine (VM) in a first target cloud and a second target cloud, wherein the request indicates an operating system that is to be deployed in the first target cloud and the second target cloud, the first target cloud comprising a configuration parameter for the first target cloud that is different from configuration parameters of the second target cloud, wherein the first target cloud is provided by a first cloud provider and the second target cloud is provided by a second cloud provider, and the server is to manage deployment of virtual machines to the first target cloud and the second target cloud;

determine whether an image repository comprising a plurality of generic VM disk images, each corresponding to a different operating system, includes a generic VM disk image corresponding to the operating system indicated in the request, wherein the generic VM disk image is not formatted for the first target cloud or the second target cloud;

responsive to the image repository not including the generic VM disk image corresponding to the operating system indicated in the request, generate the generic VM disk image;

modify, by the server, the generic VM disk image to create a cloud-formatted VM disk image for the first target cloud and a cloud-formatted VM disk image for the second target cloud, wherein modifying the generic VM disk image does not change the operating system of the generic VM disk image;

create a manifest for the cloud-formatted VM disk image for the first target cloud, the manifest comprising a description of components in the cloud-formatted VM disk image, wherein the manifest is stored on the server;

receive user credential data for a first user having a first user account with the first target cloud, and receive user credential data for a second user having a second user account with the second target cloud;

receive change data indicating a change made to the VM in the first target cloud, wherein the change is not reflected in the manifest stored on the server; and;

instantiate, by the server, a VM in the first target cloud using the cloud-formatted VM disk image for the first target cloud and the user credential data for the first user having the first user account with the first target cloud; and instantiate, by the server, a VM in the second target cloud using the cloud-formatted VM disk image for the second target cloud and the user credential data for the second user having the second user account with the second target cloud.

16. The non-transitory computer-readable storage medium of claim 15, wherein the first target cloud and the second target cloud correspond to different cloud providers.

17. The non-transitory computer-readable storage medium of claim 15, wherein to identify the generic VM disk image the processing device is to:

locate the generic VM disk image in a repository in view of the operating system specified in the request.

18. The non-transitory computer-readable storage medium of claim 15, wherein the request is a single command to build a cloud-formatted VM disk image for the first target cloud and the second target cloud.

19. The non-transitory computer-readable storage medium of claim 15, wherein the processing device is further to:

store the cloud-formatted VM disk image for the first target cloud and the cloud-formatted for the second target cloud;

receive change data indicating a change made to at least one of the VM in the first target cloud or the VM in the second target cloud;

create at least one of an updated cloud-formatted VM disk image for the first target cloud or an updated cloud-formatted VM disk image for the second target cloud in view of the change data; and provide at least one of the updated cloud-formatted VM disk image for the first target cloud to the cloud provider of the first target cloud and the updated cloud-formatted VM disk image for the second target cloud to the cloud provider of the second target cloud.

20. The non-transitory computer-readable storage medium of claim 15, wherein to modify the generic VM disk image the processing device is to at least one of:

associate a type of network protocol with the generic VM disk image, associate cloud specific management files with the generic VM disk image, define a partitioning layout, enable a service, disable a service, associate an authentication certificate with the generic VM disk image, or associate a hypervisor kernel with the generic VM disk image.

* * * * *